United States Patent
Van Brocklin et al.

(10) Patent No.: US 7,125,644 B2
(45) Date of Patent: *Oct. 24, 2006

(54) SYSTEMS AND METHODS FOR STORING DATA ON AN OPTICAL DISK

(75) Inventors: Andrew L. Van Brocklin, Corvallis, OR (US); Cari Dorsh, McMinnville, OR (US); Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

This patent is subject to a terminal disclaimer.

(21) Appl. No.: 10/639,183

(22) Filed: Aug. 11, 2003

(65) Prior Publication Data

US 2005/0037285 A1   Feb. 17, 2005

(51) Int. Cl.
*G11B 7/24* (2006.01)
*B41L 13/00* (2006.01)
*B41M 1/12* (2006.01)

(52) U.S. Cl. ............... 430/270.14; 430/945; 428/64.1; 101/114; 101/129; 369/275.3

(58) Field of Classification Search ........... 430/270.21, 430/270.11, 945, 270.16; 428/64.1; 369/288
See application file for complete search history.

(56) References Cited

U.S. PATENT DOCUMENTS

| | | | |
|---|---|---|---|
| 4,090,031 A * | 5/1978 | Russell | 369/284 |
| 4,954,380 A * | 9/1990 | Kanome et al. | 428/64.8 |
| 5,196,250 A | 3/1993 | Abe et al. | |
| 5,571,388 A * | 11/1996 | Patonay et al. | 204/461 |
| 5,684,069 A | 11/1997 | Auslander | |
| 5,693,693 A | 12/1997 | Auslander et al. | |
| 5,741,836 A * | 4/1998 | Krenceski et al. | 524/44 |
| 5,854,175 A * | 12/1998 | DeBoer et al. | 503/227 |
| 5,915,858 A * | 6/1999 | Wen | 400/61 |
| 5,958,087 A | 9/1999 | Liao et al. | |
| 5,989,772 A * | 11/1999 | Tutt et al. | 430/201 |
| 6,165,683 A | 12/2000 | Chapman et al. | |
| 6,203,069 B1 | 3/2001 | Outwater et al. | |
| 6,306,478 B1 | 10/2001 | Chen et al. | |
| 6,531,261 B1 * | 3/2003 | Usami et al. | 430/270.15 |
| 6,536,672 B1 | 3/2003 | Outwater | |
| 6,541,092 B1 * | 4/2003 | Shibata et al. | 428/64.1 |
| 6,689,616 B1 * | 2/2004 | Bosies et al. | 436/70 |
| 6,798,976 B1 * | 9/2004 | Tsumagari et al. | 386/95 |
| 7,050,387 B1 * | 5/2006 | Tsujita et al. | 369/283 |
| 2002/0091241 A1 | 7/2002 | Wang et al. | |
| 2002/0142236 A1 * | 10/2002 | Iwasaki et al. | 430/19 |
| 2004/0146812 A1 * | 7/2004 | Gore et al. | 430/343 |
| 2004/0147399 A1 * | 7/2004 | Gore | 503/221 |
| 2005/0037285 A1 * | 2/2005 | Van Brocklin et al. | 430/270.11 |

FOREIGN PATENT DOCUMENTS

| | | | |
|---|---|---|---|
| JP | 63-033477 | * | 2/1988 |
| JP | 02-004583 | * | 1/1990 |

(Continued)

OTHER PUBLICATIONS

Delaey, F. et al., "A comparative study of the photosenitizing characteristics of some cyanine dyes"; J. Photochem. Photobiol. B:Biol. 55 (2000) 27-36.*

(Continued)

*Primary Examiner*—Martin Angebranndt

(57) ABSTRACT

Optical disks include machine readable data that is written with dye that is invisible to the naked eye and a laser-imagable coating that forms marks that are visible to the naked eye.

15 Claims, 2 Drawing Sheets

FOREIGN PATENT DOCUMENTS

| | | | |
|---|---|---|---|
| JP | 03-126581 | * | 5/1991 |
| JP | 05-258346 | * | 10/1993 |
| JP | 09-240145 | * | 9/1997 |
| JP | 2002-122729 | * | 4/2000 |
| JP | 2002-203321 | * | 7/2002 |
| JP | 2002-328446 | * | 11/2002 |
| JP | 2003-162022 | * | 6/2003 |

OTHER PUBLICATIONS

Machine generated translation of Sanpei, Takeshi.*
Machine generated translation of Santo et al 05-258346.*
Machine generated translated of Harada, Toru.*
Machine generated translation of Shimazaki et al.*

* cited by examiner

SYSTEMS AND METHODS FOR STORING DATA ON AN OPTICAL DISK

BACKGROUND

Oftentimes it may be desirable to write data onto optical disks such as CDs or DVDs. The data that may be desired to be written may include, inter alia, visible data (e.g., labeling), primary data (e.g., music, video, text, etc . . . ), and/or control data (e.g., tracking data, rotational data, laser focal data, copyright information, etc . . . ). On many optical disks, primary data may be written onto one side and visible data written onto the other. For example, music may be written on one side and a label written onto the other side.

In order to read and write data onto an optical disk properly, it may be necessary that the reading and/or writing laser be able to access control data to ensure that the data are read and/or written accurately. The control data for the primary data may be pre-printed on the disk during manufacture and may be small and invisible to the naked eye.

In contrast, other control data, such as that for the laser reading and/or writing the visible data, may be visible to the naked eye and may interfere with the visible data or otherwise be printed in an aesthetically undesirable manner, such as, unappealing saw tooth markings on the inner or outer edge of the disk. It may be desirable to print data onto the surface of an optical disk in a manner which does not detract from or interfere with the aesthetics of the disk.

SUMMARY

Disclosed herein are optical disks wherein data is written with dye that is invisible to the naked eye.

BRIEF DESCRIPTION OF THE DRAWINGS

For a detailed description of embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . . "

DETAILED DESCRIPTION

The following discussion is directed to various embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
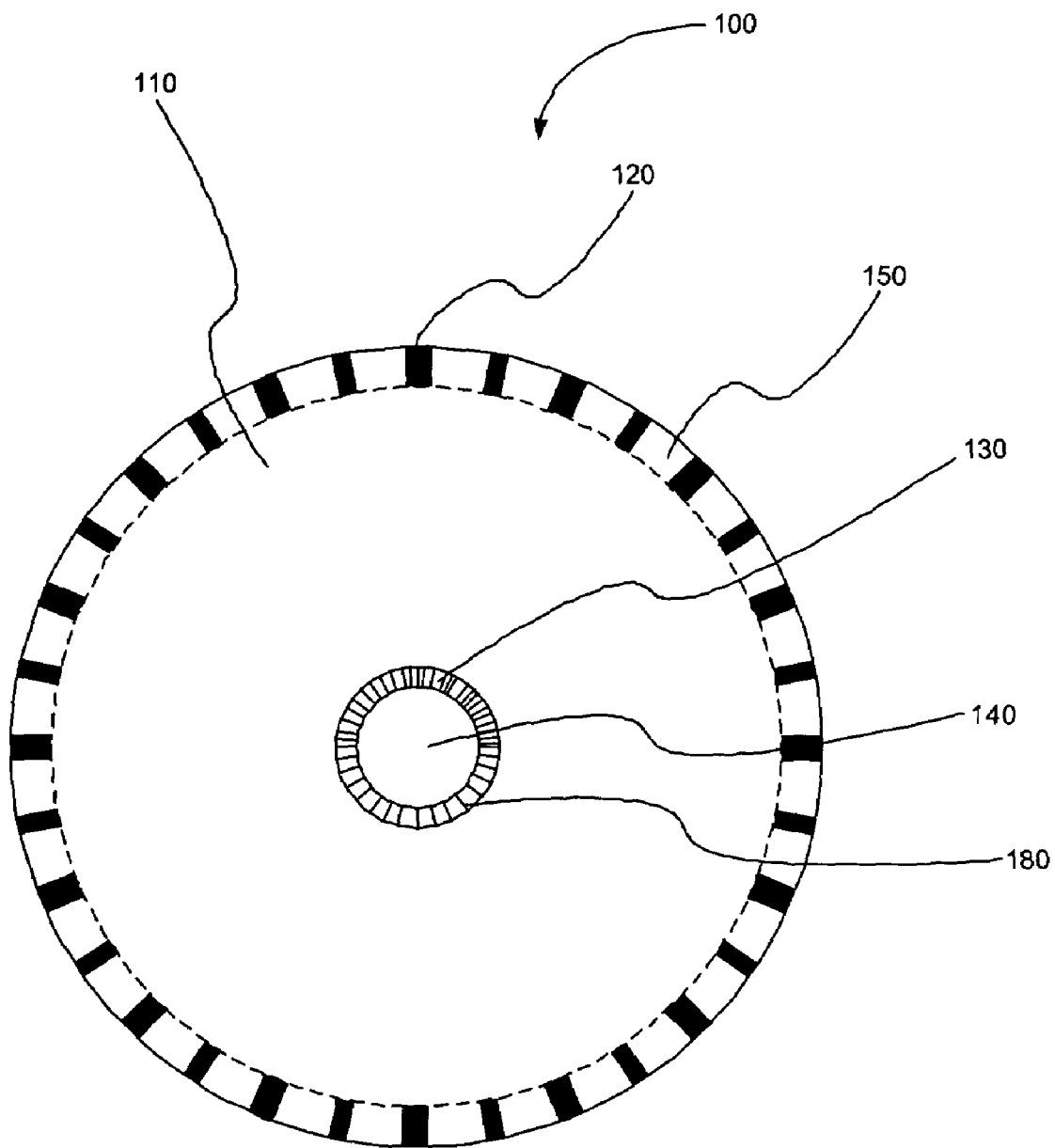
FIG. 1 is a schematic drawing of an optical disk in accordance with embodiments of the present invention.

Referring now to FIG. 1, there is shown an optical disk 100 having a center opening 140, a center control data ring 130, a primary data portion 110, and a control data ring 150. In some embodiments, data portion 110 may be suitable for writing visible data (e.g., labeling). For example, data portion 110 may be coated with a dye which changes color upon absorption of energy. The dye may then be supplied with energy, such as a laser, in an imagewise fashion to write data (e.g., label) the optical disk. The control data for the laser (e.g., tracking data, rotational data, focal data, copyright data, etc . . . ) may be pre-printed on the surface of the disk on the inner or outer rim in a dye that is invisible to the naked eye on control data ring 150 and/or control data ring 130 as invisible control data layer 120 and/or inner invisible control data layer 180. Embodiments of invisible dyes may include those dyes having an optical contrast of less than 0.2 optical density units in the visible range of 400 nm to 600 nm. The invisible dye may be readable by a sensor, such as an optical pickup unit (OPU). Generally, an OPU may illuminate at least one section of an invisibly marked section at a time. Light reflected back from the invisibly marked surface is sensed by a device sensitive to the illumination wavelength. An example of an OPU such as the one described above may be found in a CD, CD-R, or CD-RW drive. By way of example only, control data may be written using the following compounds: IR780 (Aldrich 42,531-1) (1), IR1040 (Aldrich 40,513-2) (2), IR783 (Aldrich 54,329-2) (3), Syntec 9/1 (4), Syntec 9/3 (5), metal complexes (such as dithiolane metal complexes (6) and indoaniline metal complexes (7)), phthalocyanines, naphthalocyanines (e.g., hexyl naphthalocyanine), or 800NP (a proprietary dye available from Avecia, PO Box 42, Hexagon House, Blackley, Manchester M9 8ZS, England):

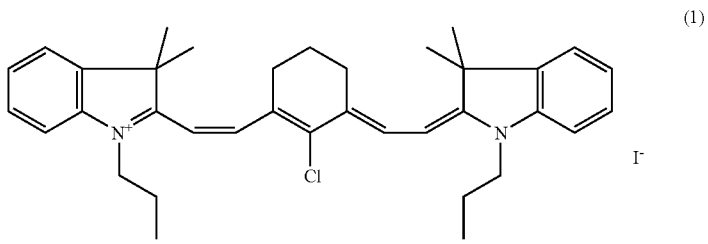

(1)

-continued

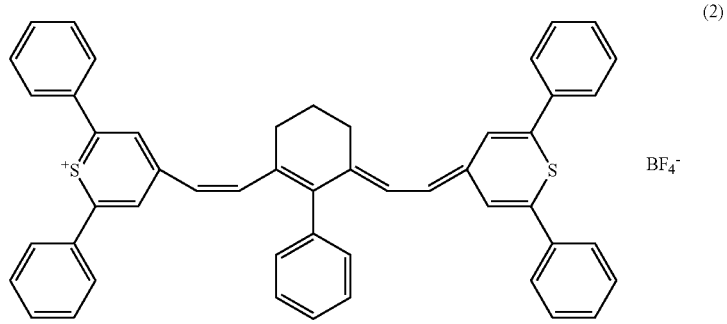
(2)

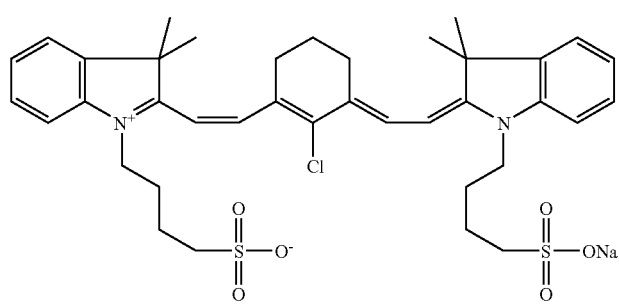
(3)

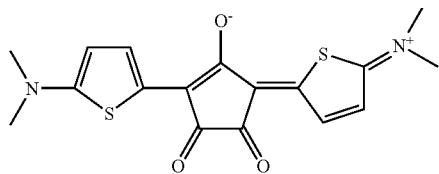
(4)

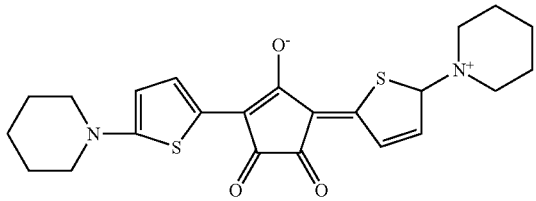
(5)

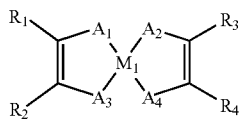
(6)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

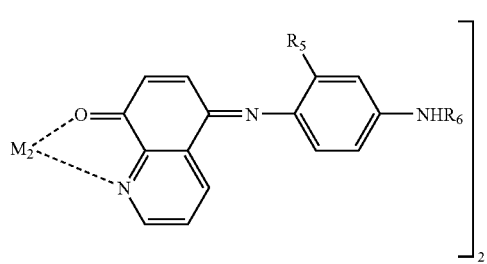
(7)

where $M_2$ is Ni or Cu and $R_5$ and $R_6$ are aryl or alkyl groups with or without halo substituents. Additional examples of suitable dyes may be found in "Infrared Absorbing Dyes", Matsuoka, Masaru, ed., Plenum Press (1990) (ISBN 0-306-43478A) and "Near-Infrared Dyes for High Technology Applications", Daehne, S.; Resch-Genger, U.; Wolfbeis, O. Ed., Kluwer Academic Publishers (ISBN 0-7923-5101-0).

For example, IR780 (1) may be combined with Kemco SKCD 1051 UV curable lacquer (available from Kemco International Associates, Inc., 25935 Detroit Rd. No. 333, Westlake, Ohio 44145) and then screen printed or spin coated onto the optical disk. Other examples of suitable lacquers may include, without limitation, Nor-Cote CDG000 (available from Nor-Cote International, Inc., Crawfordsville, IN) which contains a photoinitiator (hydroxy ketone) and organic solvent acrylates (e.g., methyl methacrylate, hexyl methacrylate, beta-phenoxy ethyl acrylate, and hexamethylene acrylate); CN293; or CN294 (acrylated polyester oligomers) (available from Sartomer Company, Inc., 502 Thomas Jones Way, Exton, Pa. 19341). The invisible dye may be printed on the optical disk substrate in a pattern which is readable by a sensor such as a laser. For example, the data may be printed on the disk as an encoded series of bars 120 (e.g., similar to a UPC label), dashes, or dots.

Figure 2:
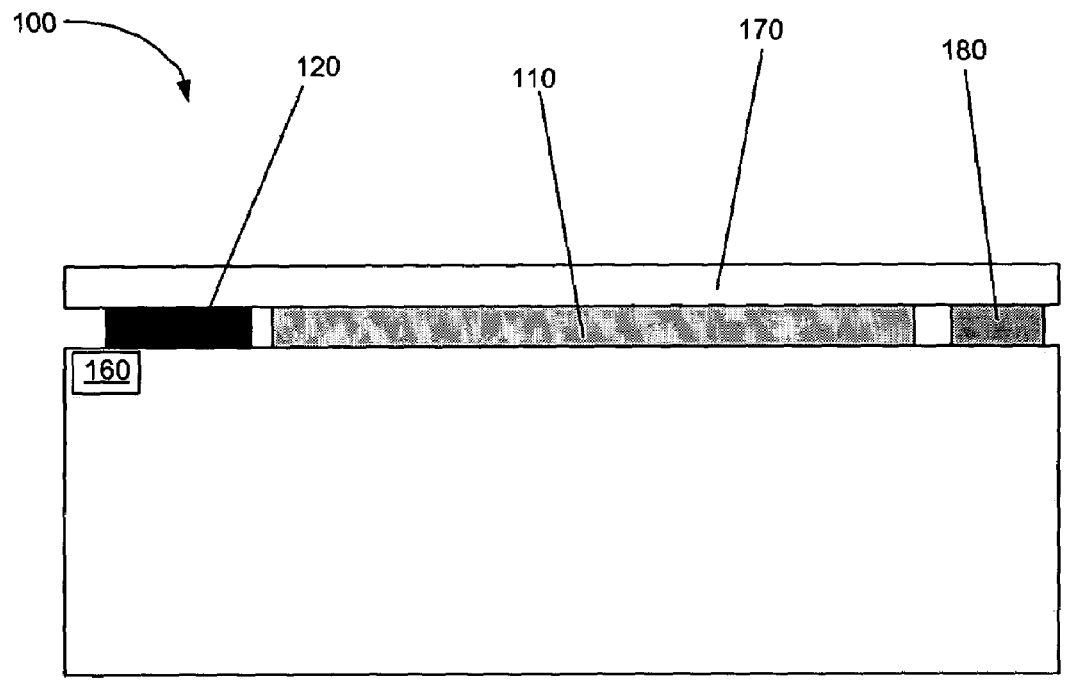
FIG. 2 is a schematic side cutaway view of a portion of an optical disk in accordance with embodiments of the present invention.

Referring now to FIG. 2, there is shown a cut away side view of one side of an optical disk 100 in accordance with embodiments of the present invention. The optical disk of FIG. 2 comprises a disk substrate 160, a factory lacquer layer 170, An optical writable label area 110, an outer invisible control data layer 120 and an inner invisible data layer 180. In some embodiments, the control data layer 120 may be a series of bars, dots, or dashes which is applied (e.g., screen printed or spin coated) onto the surface of the optical disk 100. In other embodiment, the control data may be applied beneath a lacquer layer (e.g., as is shown in FIG. 2), may be intermixed with a lacquer layer, or may be incorporated into the substrate. The invisible control data, while invisible to the unaided human eye, is readable by a sensor, such as an OPU. The invisible control data may be applied to the disk by any suitable method.

In some embodiments, the invisible ink data may be printed over the portion of the disk which contains the visible data. In other embodiments, the invisible ink data may be printed over areas of the disk which does not contain the visible data. In still other embodiments, the invisible ink data may be printed in both areas.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. An optical disk comprising:
a portion suitable for laser-writing human-visible data; and
screen printed machine-readable control data written with a dye that is invisible to the naked eye;
wherein said laser-writable portion and said control data are on the same side of the optical disk.

2. The optical disk of claim 1 wherein the control data is written on a rim of the optical disk.

3. The optical disk of claim 1 wherein the control data is not printed on the portion suitable for writing visible data.

4. The optical disk of claim 1 wherein the control data is printed on the portion suitable for writing visible data.

5. The optical disk of claim 1 wherein the dye is selected from the group consisting of the following compounds:

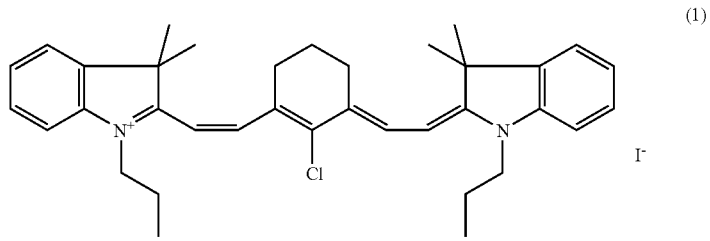

(1)

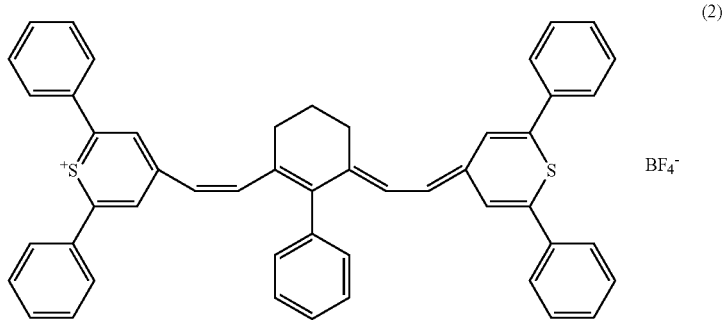

(2)

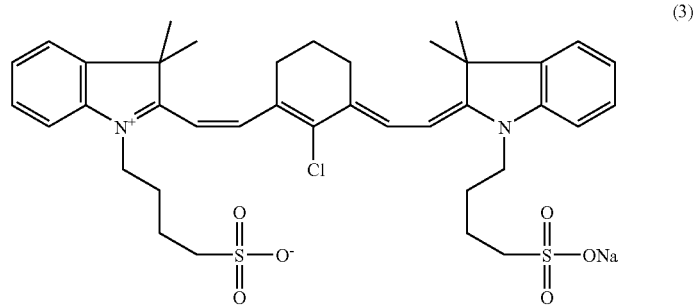

(3)

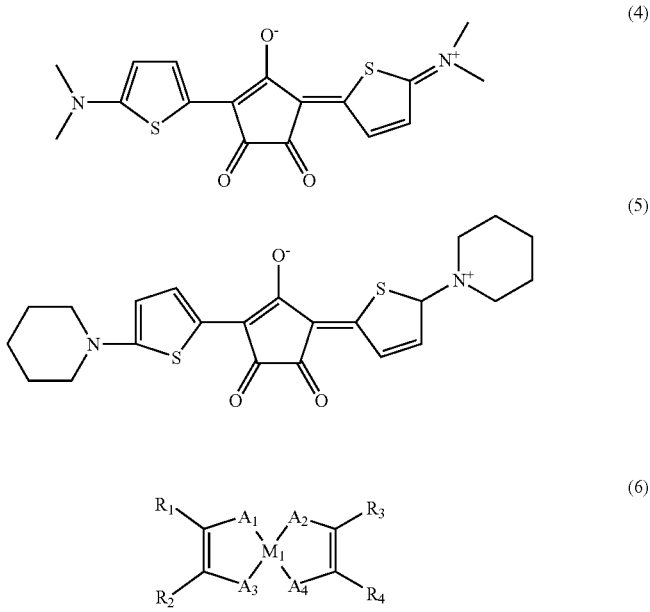

(4)

(5)

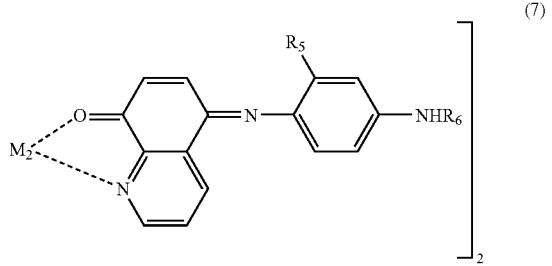

(6)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

(7)

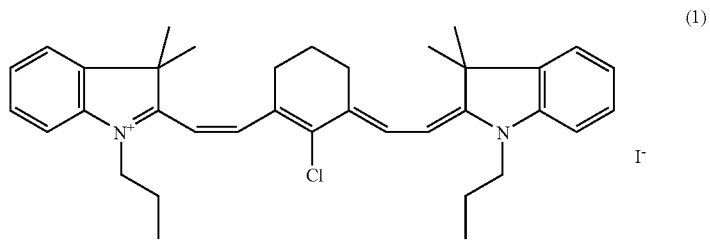

where $M_2$ is Ni or Cu and $R_5$ and $R_6$ are aryl or alkyl groups with or without halo substituents, phthalocyanines, and naphthalocyanines.

6. A method for writing data onto an optical disk, the method comprising:
  writing using screen printing machine-readable control data onto p first side of an optical disk with a dye that is not visible to an unaided human eye, and
  using a laser to write human-visible data in a markable laver on said first side of the disk.

7. The method of claim 6 wherein the control data is written on a rim of the optical disk.

8. The method of claim 6 wherein the control data is printed not the markable layer.

9. The method of claim 6 wherein the control data is printed on the markable layer.

10. The method of claim 6 wherein the dye is selected from the group consisting of the following compounds:

(1)

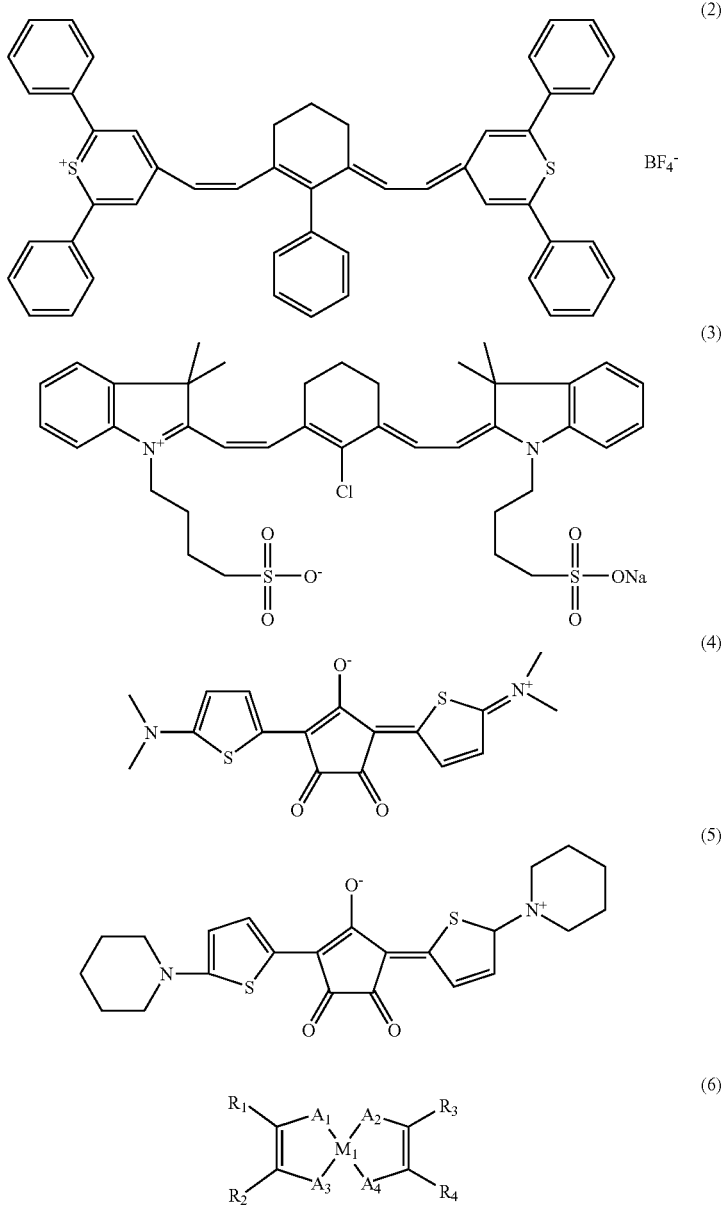

where $M_1$ is a transition metal, $R_1$, $R_2$, $R_3$, and $R_4$ are alkyl aryl groups with or without halo substituents, and $A_1$, $A_2$, $A_3$, and $A_4$ can be S, NH, or Se;

where $M_2$ is Ni or Cu and $R_5$ and $R_6$ are aryl or alkyl groups with or without halo substituents, phthalocyanines, and naphthalocyanines.

11. A means for storing data on an optical disk, the means comprising:
  means for providing screen printed machine-readable control data on a first side of optical disk, wherein the control data comprises a dye that is invisible to the naked eye; and
  means for laser-writing human-visible data on the first side of the disk.

12. The means of claim 11 wherein the invisible dye is affixed on a rim of the optical disk.

13. The means of claim 11 wherein the invisible dye is not affixed on the means for writing visible data.

14. The means of claim 11 wherein the invisible dye is affixed on the means for writing visible data.

15. The means of claim 11 wherein the invisible dye is selected from the group consisting of the following compounds:
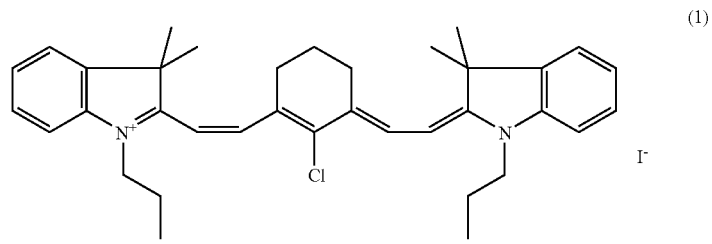
(1)
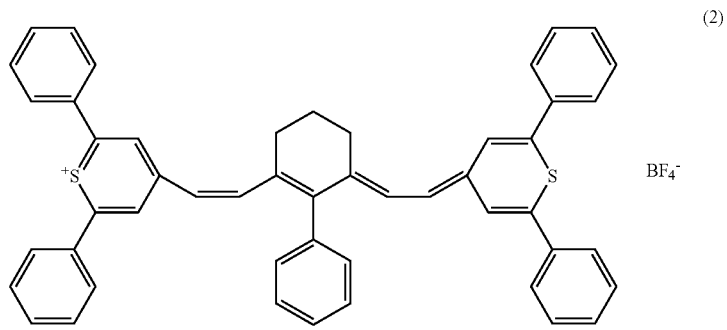
(2)
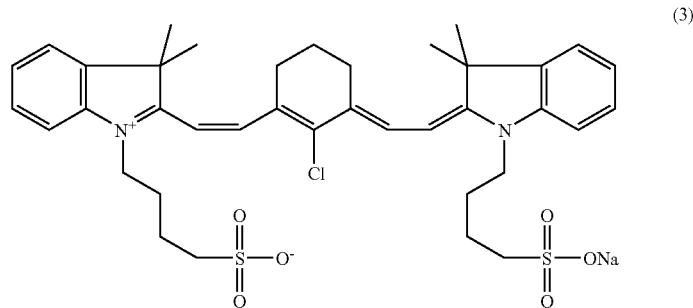
(3)
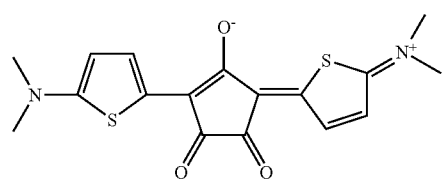
(4)
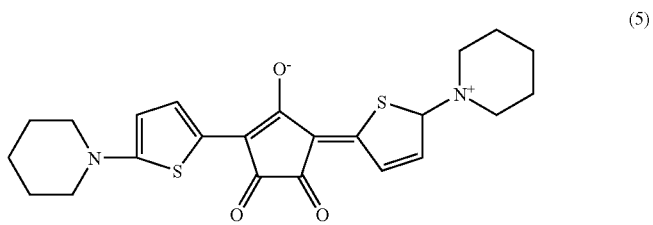
(5)
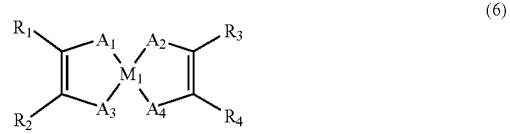
(6)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;
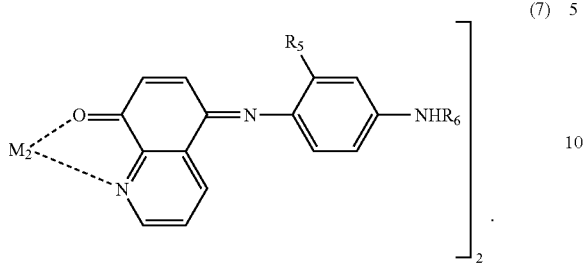
(7)
where $M_2$ is Ni or Cu and $R_5$ and $R_6$ are aryl or alkyl groups with or without halo substituents, phthalocyanines, and naphthalocyanines.
* * * * *

UNITED STATES PATENT AND TRADEMARK OFFICE
CERTIFICATE OF CORRECTION

| | | |
|---|---|---|
| PATENT NO. | : 7,125,644 B2 | |
| APPLICATION NO. | : 10/639183 | |
| DATED | : October 24, 2006 | |
| INVENTOR(S) | : Van Brocklin et al. | |

It is certified that error appears in the above-identified patent and that said Letters Patent is hereby corrected as shown below:

Col. 8 (line 35), delete "p" and insert therefor --a--.

Col. 8 (line 39), delete "laver" and insert therefor --layer--.

Col. 8 (line 43), delete "printed not" and insert therefor --not printed on--.

Signed and Sealed this

Fourth Day of September, 2007

JON W. DUDAS
*Director of the United States Patent and Trademark Office*